May 17, 1966     A. E. BRYMER     3,251,668
METHOD FOR MOLD RELEASE DURING GLASS FORMING
Filed April 20, 1962     2 Sheets-Sheet 1
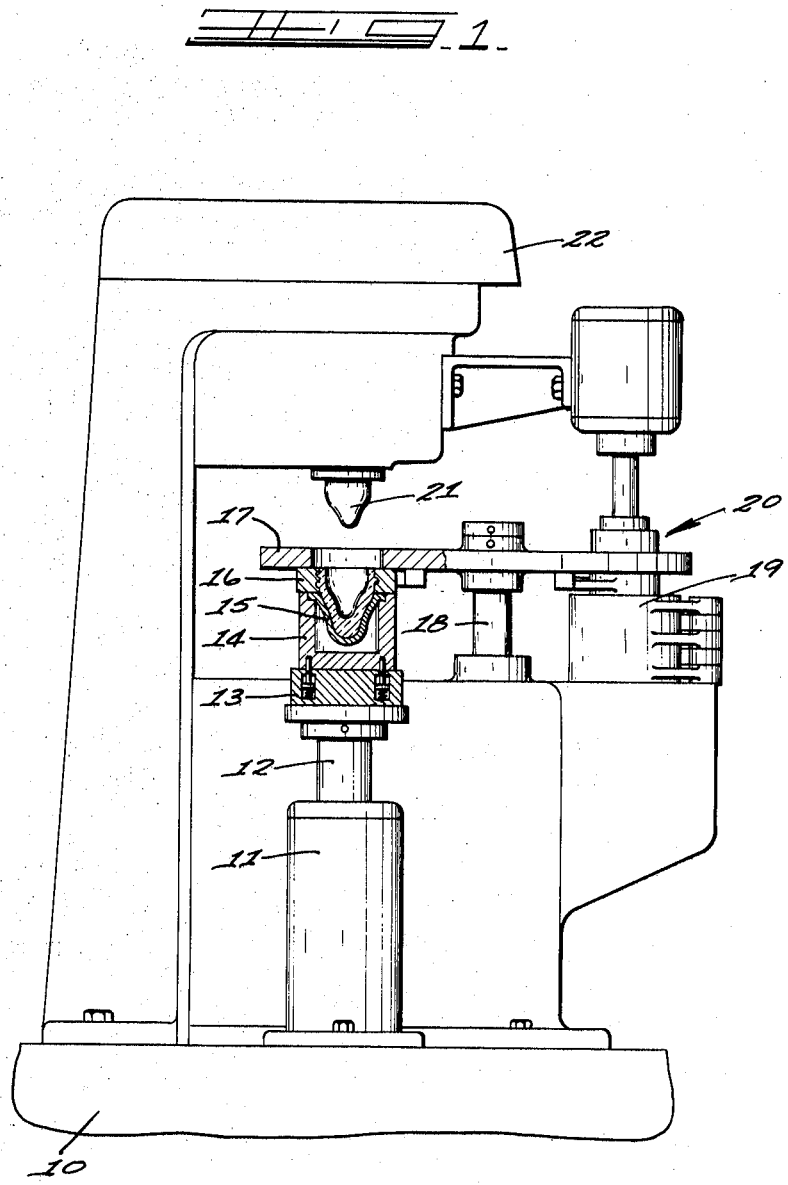
INVENTOR.
ANDREW E. BRYMER
BY W. A. Schaich +
D. T. Innis
ATTORNEYS May 17, 1966  A. E. BRYMER  3,251,668
METHOD FOR MOLD RELEASE DURING GLASS FORMING
Filed April 20, 1962  2 Sheets-Sheet 2
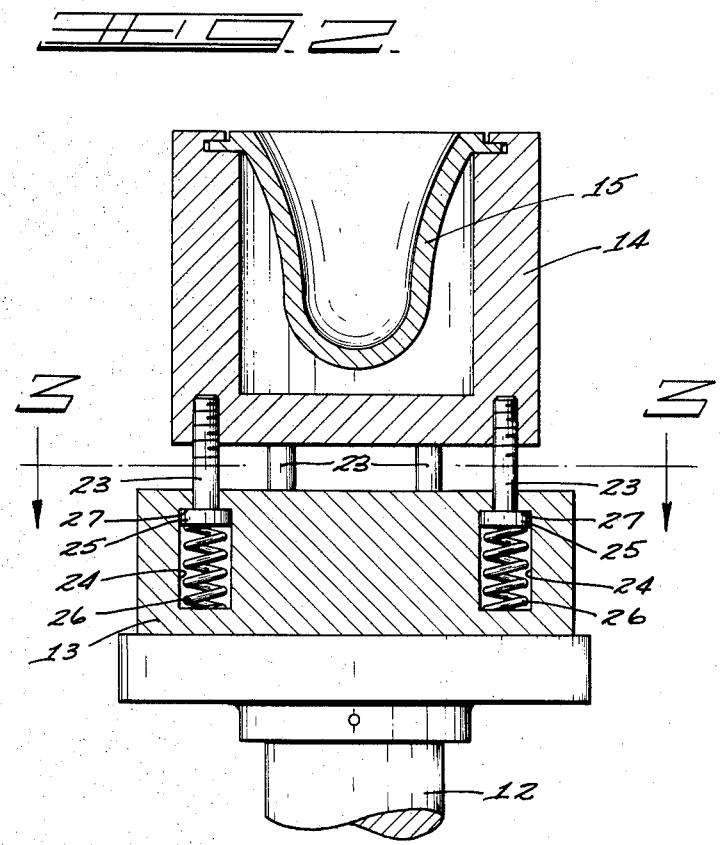
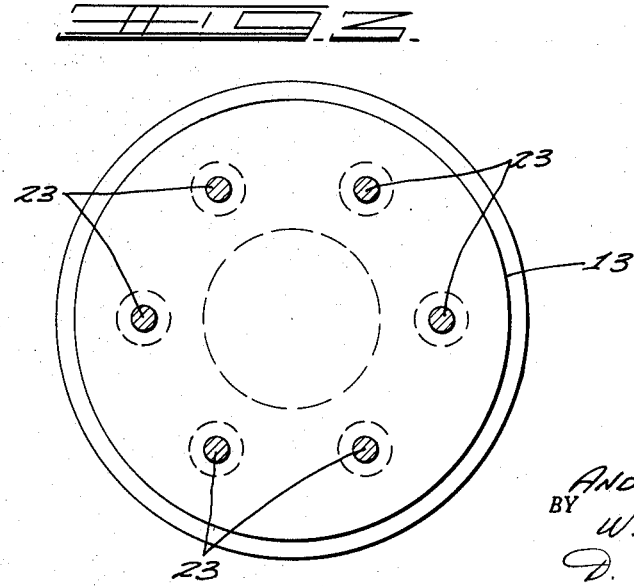
INVENTOR.
ANDREW E. BRYMER
BY
ATTORNEYS

United States Patent Office 3,251,668
Patented May 17, 1966

3,251,668
METHOD FOR MOLD RELEASE DURING GLASS FORMING
Andrew E. Brymer, Toledo, Ohio, assignor to Owens-Illinois Glass Co., a corporation of Ohio
Filed Apr. 20, 1962, Ser. No. 189,051
2 Claims. (Cl. 65—77)

This invention relates to a method and apparatus for forming parisons or pressed glass articles. More particularly, this invention relates to a method and apparatus for facilitating the removal of a mold from a glass article pressed therein.

In the modern glass forming machines of the press and blow type, production of articles per mold cavity per minute is of the order of from 20 to 30 articles. It is a requisite that the molds, when stripped from the articles, will not adhere to the articles. At increased speeds this problem becomes more important from the standpoint that the shaped article, at the time the mold is stripped therefrom, is relatively hot. With the further increase in forming speeds, the problem will be more acute.

With the foregoing in mind, it is an object of this invention to provide a method of stripping the mold from the formed article by the utilization of an impact force.

It is a further object of this invention to provide an apparatus for impacting the molds in the stripping direction to insure clean separation of the mold from the article.

Other and further objects will be apparent from the following description taken in conjunction with the annexed sheets of drawings wherein:

FIG. 1 is a part sectional elevation through a glass forming unit utilizing the present invention.

FIG. 2 is a sectional elevational view of the forming mold and its support.

FIG. 3 is a cross-sectional view taken at line 3—3 on FIG. 2.

The present invention is adapted for use in a glass molding machine which may comprise a supporting base, a parison forming mold, a parison transfer unit and a parison blowing mold, all adapted to work in coordination to produce blown glass articles as illustrated in FIG. 1 hereof.

Referring in particular to FIG. 1 there is shown such a glass molding unit comprising a base 10 supporting a vertically disposed hydraulic cylinder 11 having a piston rod 12 extending therefrom. Mounted on the rod 12 is a mold supporting pedestal 13 which has a generally flat horizontal upper surface. A parison mold cage 14 is resiliently mounted to the pedestal 13. The details of this mounting will be described later with respect to FIG. 2.

The mold cage 14 carries a parison or shaping mold 15 which is adapted to be raised into contact with the lower surface of the neck mold 16. The neck mold, in turn, is connected to the under surface of a horizontal turret 17. The turret 17 is supported at its center by drive shaft 18 which is adapted to rotate the turret to transfer parisons retained by the neck mold 16 to a partible blow mold 19, which, in combination with the vertically shiftable blow head 20, expands the parison into completed form. The mold charge, which is delivered to the mold 15, is pressed therein by the downward movement of a plunger or shaping tool 21 which is reciprocably mounted within the upper support structure 22. The plunger 21 and mold 15 remain in vertical alignment during the operation of the machine.

Referring to FIGS. 2 and 3, the manner of mounting the mold cage with respect to the pedestal is clearly illustrated. The mold cage 14 has a plurality of bolts 23 circumferentially spaced about and threaded into the bottom thereof. The pedestal 13 has a plurality of cavities 24 formed therein within which the heads 25 of bolts 23 are adapted to slide. There are a plurality of cavities 24 equal in number to the number of bolts 23. Within each cavity between the bottom surface thereof and the bolt head 25 is a spring 26 normally under compression, which is adapted to maintain the bolt head 23 seated against the upper shoulders 27 of the cavities 24. The mold 15 is retained within the mold cage 14 against relative vertical movement so that the mold and cage move as a unit.

As shown in FIG. 1 when the mold 15 and its cage 14 are raised into contact with the neck mold 16, the springs 26 will be compressed until the upper surface of the pedestal 13 contacts the under surface of the mold cage 14. When in this position, the charge of molten glass within the mold 15 is pressed by the downward movement of the plunger 21. With the completion of the pressing operation, the plunger will be retracted to the position shown in FIG. 1 and the hydraulic cylinder 11 will be actuated to lower the pedestal 13. The springs 26 will maintain the mold 15 in contact with the neck mold during the initial downward movement of the pedestal 13. When the pedestal has been lowered to the extent determined by the length of the bolts 23, the bolt heads 25 will contact the shoulders 27 and the mold 15 and its cage 14 will be moved downward, stripping the mold from the parison. Inasmuch as the pedestal 13 is lowered at a relatively constant speed, the contacting of the heads 25 of the bolts 23 with the shoulders 27 will result in the application of an impact force to the cage 14 and the mold 15. This impact force will result in stripping the mold 15 away from the parison with much less chance of the parison being distorted or sticking to the mold 15.

While the invention has been described in connection with a single parison mold, it should be obvious that the principle of the invention would be equally applicable to a forming machine utilizing plural mold cavities.

Furthermore, the basic theory of this invention could be equally applicable to the stripping of a plunger, such as that shown in FIG. 1, from the interior of the parison.

As can readily be seen, the movement of a glass contacting surface away from the glass, when in a relatively hot and deformable state, should advantageously be as quick and sudden as possible to insure a clean separation.

Various modifications may be resorted to within the spirit and scope of the appended claims.

I claim:
1. In the method of forming shaped glass articles the improvement which comprises the steps of delivering a charge of molten glass within a mold, moving a shaping tool into and out of the charged mold to shape the glass article, holding a portion of the article stationary and applying an impact force to the mold to initiate the stripping of the mold from the formed article.

2. The method defined in claim 1, in which the mold is provided with a support, the support being moved at such a rate and speed that when its movement is terminated an impact force is suddenly applied to the mold in the stripping direction thereby to strip the mold from the article.

References Cited by the Examiner

UNITED STATES PATENTS

| | | | |
|---|---|---|---|
| 53,816 | 4/1866 | Guilford | 65—322 |
| 779,089 | 1/1905 | Main | 65—231 |
| 1,115,785 | 3/1914 | Crawford | 65—317 X |
| 1,601,836 | 10/1926 | Stenhouse | 65—231 |
| 1,603,025 | 10/1926 | Clarke | 65—361 X |
| 1,942,832 | 1/1934 | Piazzoli | 65—361 X |
| 2,334,653 | 11/1943 | Senkbeil | 65—323 |
| 2,992,515 | 7/1961 | Mathias | 65—322 X |

DONALL H. SYLVESTER, *Primary Examiner.*

F. W. MIGA, *Assistant Examiner.*